US009423625B2

United States Patent
Dong et al.

(10) Patent No.: US 9,423,625 B2
(45) Date of Patent: Aug. 23, 2016

(54) DISPLAY PANEL AND 3D DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Tiansong Dong, Beijing (CN); Hongming Zhan, Beijing (CN); Jiaan Liu, Beijing (CN); Jaeyoung Joo, Beijing (CN); Yinghua Zheng, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 190 days.

(21) Appl. No.: 14/348,409

(22) PCT Filed: Jun. 20, 2013

(86) PCT No.: PCT/CN2013/077532
§ 371 (c)(1),
(2) Date: Mar. 28, 2014

(87) PCT Pub. No.: WO2014/153865
PCT Pub. Date: Oct. 2, 2014

(65) Prior Publication Data
US 2015/0219914 A1    Aug. 6, 2015

(30) Foreign Application Priority Data
Mar. 29, 2013  (CN) .......................... 2013 1 0106813

(51) Int. Cl.
*G02F 1/1337* (2006.01)
*G02B 27/22* (2006.01)
*G02B 27/26* (2006.01)
*G02F 1/1343* (2006.01)
*G02F 1/1335* (2006.01)

(52) U.S. Cl.
CPC ........... *G02B 27/2242* (2013.01); *G02B 27/26* (2013.01); *G02F 1/1337* (2013.01);
(Continued)

(58) Field of Classification Search
CPC ..................... G02F 1/1337; G02F 1/133711
See application file for complete search history.

(56) References Cited

U.S. PATENT DOCUMENTS

| 2008/0094545 | A1 | 4/2008 | Ko |
| 2009/0115712 | A1 | 5/2009 | Morimoto et al. |

FOREIGN PATENT DOCUMENTS

| CN | 101166287 A | 4/2008 |
| CN | 101424806 A | 5/2009 |

(Continued)

OTHER PUBLICATIONS

International Search Report mailed Dec. 26, 2013; PCT/CN2013/077532.
(Continued)

*Primary Examiner* — Phu Vu
(74) *Attorney, Agent, or Firm* — Ladas & Parry LLP

(57) ABSTRACT

A display panel including a first substrate, a first polarizer sheet arranged on the first substrate, a second substrate, a second polarizer sheet arranged on the second substrate, a liquid crystal layer located between the first substrate and the second substrate, and further comprises a pixel electrode, a common electrode, a first alignment layer and a gate line formed on the first substrate, at least one of the pixel electrode and the common electrode is a comb-like electrode, a transmission axis of the first polarizer sheet is parallel with the line along which an alignment direction of the first alignment layer is located, and the transmission axis of the first polarizer sheet is perpendicular to a transmission axis of the second polarizer sheet, and the line along which the alignment direction of the first alignment layer is located is at a predetermined angle greater than 0° and less than 90° with the respect to the gate line. Such a display panel can obtain better angular characteristic of 3D visual sense.

15 Claims, 2 Drawing Sheets

(52) U.S. Cl.
CPC ... *G02F1/133528* (2013.01); *G02F 1/133711* (2013.01); *G02F 1/133784* (2013.01); *G02F 1/134309* (2013.01); *G02F 2001/133531* (2013.01); *G02F 2001/134372* (2013.01)

(56) References Cited

FOREIGN PATENT DOCUMENTS

| CN | 103149740 A | 6/2013 |
| CN | 203117612 U | 8/2013 |

OTHER PUBLICATIONS

First Chinese Office Action dated Jun. 4, 2014; Appln. No. 201310106813.4.

Second Chinese Office Action dated Dec. 18, 2014; Appln. No. 201310106813.4.

International Preliminary Report on Patentability issued Sep. 29, 2015; PCT/CN2013/077532.

DISPLAY PANEL AND 3D DISPLAY DEVICE

TECHNICAL FIELD

Embodiments of the present invention relate to a display panel and a three-dimensional (3D) display device.

BACKGROUND

Most of the barrier naked-eye 3D technologies commonly applied at present employ twisted nematic (TN) barrier structure, the viewing angle of which is essentially identical to that of an ordinary TN display screen.

However, the display screen cooperates with a TN barrier structure generally is a wide view angle display screen employing a wide view angle technology, such as, in-plane switching (IPS) display, fringe field switching (FFS) display, or advanced super dimension switch (ADS) display. In a wide view angle display, the transmission axis of an upper polarizer sheet and a lower polarizer sheet are perpendicular to each other, and the alignment directions of an upper alignment layer (such as the alignment layer on a color filter substrate) and a lower alignment layer (such as the alignment layer on an array substrate) are opposite to each other, and the transmission axis of the lower polarizer sheet is parallel with the line, along which the alignment direction of the lower alignment layer is located. The pixel electrode in the pixel structure of the wide view angle display is usually strip-shaped. As to a single domain mode (all of the strips of a pixel electrode are parallel with each other), the strip-shaped pixel electrode is parallel with the line, along which the alignment direction of the lower alignment layer is located, and parallel with or perpendicular to a gate line. As to a double-domain mode, as illustrated in FIG. 1, the line along which the alignment direction (illustrated by the arrow in FIG. 1) of the lower alignment layer is located is parallel with the gate line, and the strip-shaped pixel electrode 2 is at an angle of generally 7°~11° with respect to the line along which the alignment direction of the lower alignment layer is located.

These two display modes (TN and wide view angle technologies) possess certain difference in view of the transmission angle of the polarizer sheet, and generally, such angle difference is 45° (this angle is connected with the alignment direction of the alignment layer of a respective wide view angle display panel). As illustrated in FIG. 2, the solid arrow indicates the initial alignment direction of liquid crystal (that is, the alignment direction of the alignment layer), and the dotted arrow indicates the direction of the transmission axis of a polarizer sheet, and the dotted line indicates the direction of a light path. As can be seen from FIG. 2, the direction of the transmission axis of the polarizer sheet on the side of the light exiting surface of the wide view angle display possesses angle difference of 45° with respect to the direction of the transmission axis of the polarizer sheet at the light entering surface of the 3D grating.

In order for making the 3D grating match with the wide view angle display, that is, that the transmission axis of the upper polarizer sheet of the wide view angle display panel is parallel with the transmission axis of the lower polarizer sheet of the 3D grating, the transmission axis of the 3D grating (i.e., the adhesion direction of the polarizer sheet of the 3D grating, and the alignment direction of the alignment layer) is usually subjected to rotation of an angle of 45° so as to match with the direction of the transmission axis at the light exiting side of the wide view angle display. However, due to the rotation, the viewing angle of the 3D grating will departure from the optimal viewing direction for human eyes (which optimal direction is usually at the 6 clock direction, i.e., right ahead along a sight line), thus invoking bad viewing angle characteristics during 3D display.

SUMMARY

Embodiments of present invention can make a wide view angle display panel match with a 3D grating, thus improving the visual sense angle characteristics of the barrier 3D display.

One aspect of the present invention provides a display panel, comprising a first substrate, a first polarizer sheet arranged on the first substrate, a second substrate, a second polarizer sheet arranged on the second substrate, a liquid crystal layer located between the first substrate and the second substrate, and a pixel electrode, a common electrode, a first alignment layer and a gate line formed on the first substrate. At least one of the pixel electrode and the common electrode is a comb-like electrode, a transmission axis of the first polarizer sheet is parallel with the line along which an alignment direction of the first alignment layer is located, and the transmission axis of the first polarizer sheet is perpendicular to a transmission axis of the second polarizer sheet, and the line along which the alignment direction of the first alignment layer is located is at a predetermined angle, greater than 0° and less than 90°, with respect to the gate line.

In one example, the predetermined angle is 40° to 50°.

In one example, the predetermined angle is 45°.

In one example, the pixel electrode is the comb-like electrode, the common electrode is a plate electrode, the comb-like pixel electrode is closer to the liquid crystal layer with respect to the common electrode, the comb-like pixel electrode is parallel with the line along which the alignment direction of the first alignment layer is located, or is at an angle of 7° to 11° with respect to the line along which the alignment direction of the first alignment layer is located.

In one example, the common electrode is the comb-like electrode, the pixel electrode is a plate electrode, the comb-like common electrode is closer to the liquid crystal layer than the pixel electrode, the comb-like common electrode is parallel with the line along which the alignment direction of the first alignment layer is located, or is at an angle of 7° to 11° with respect to the line along which the alignment direction of the first alignment layer is located.

In one example, both the pixel electrode and the common electrode are comb-like electrodes, and are parallel with the line along which the alignment direction of the first alignment layer is located, or are at 7° to 11° with respect to the line along which the alignment direction of the first alignment layer is located.

In one example, the display panel further comprises a second alignment layer formed on the second substrate, and the alignment direction of the first alignment layer is opposite to an alignment direction of the second alignment layer.

Another aspect of the present invention also provides a 3D display device comprising a twisted nematic 3D grating and the display panel according to any one of the above-described display panels, and the twisted nematic 3D grating is located at a light exiting side of the display panel.

In one example, the transmission axis of the second polarizer sheet at the light exiting side of the display panel is parallel with the transmission axis of the polarizer sheet at a light entering side of the twisted nematic 3D grating.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

To make clearer the object, technical solutions and advantages of the embodiments of present invention, a clear and full description of the technical solution of the embodiment of present invention will be made with reference to the accompanying drawings of the embodiment of present invention. Obviously, the described embodiments are merely part of the embodiments of the present invention, but not all the embodiments. Based on the described embodiments of present invention, all the other embodiments acquired by the ordinary skilled in this art, without any creative labor, fall into the protective scope of the present invention.

Unless defined otherwise, the technical or scientific terms being used should take the meaning usually understood by the ordinary skilled in this art of present invention. The words "first", "second" as well as similar words used in the patent application specification and claims of the present invention do not mean any sequence, quantity or importance, but are only used to distinguish different components. Also, "a", "an", "the" and the like does not mean quantitative restriction, but refers to the existence of at least one. Wording "including" or "comprising" and the like means that element elements or articles before this word encompass the elements or articles and their equivalents listed after this word, instead of instead of excluding other elements or articles. "Connected" or "coupled with" and the similar words are not limited to physical or mechanical connections, but may comprise electrical connection, no matter directly or indirectly. "On", "under", "left", "right" and the like are only used for representing a relative positional relationship, when the described object has changed its absolute position, this relative positional relationship positional relationship may also vary accordingly.

Figure 3:
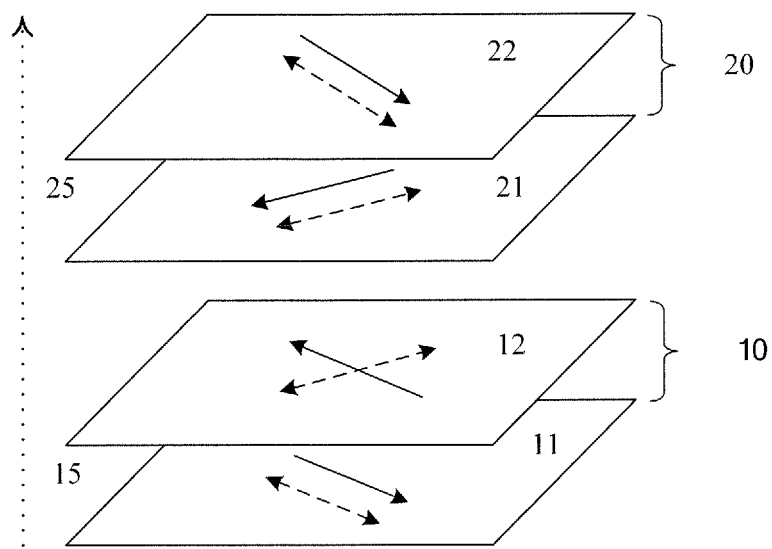
FIG. 3 is a schematic view showing the matching relationship between a display panel and a 3D grating according to an embodiment of present invention.

The display panel of the present embodiment may be an IPS or ADS mode wide view angle display panel, as illustrated in FIG. 3, the display panel 10 comprises a first substrate (not illustrated), a first polarizer sheet 11 arranged on the first substrate, a second substrate (not illustrated), a second polarizer sheet 12 arranged on the second substrate, and a liquid crystal layer 15 provided between the first substrate and the second substrate.

The first substrate and the second substrate are arranged oppositely to each other, and form a liquid crystal cell by a sealant, for example. The first polarizer sheet 11 is formed at the outer side of the first substrate with respect to the liquid crystal layer 15; and the second polarizer sheet 12 is, for example, formed at the outer side of the second substrate with respect to the liquid crystal layer 15.

Figure 4:
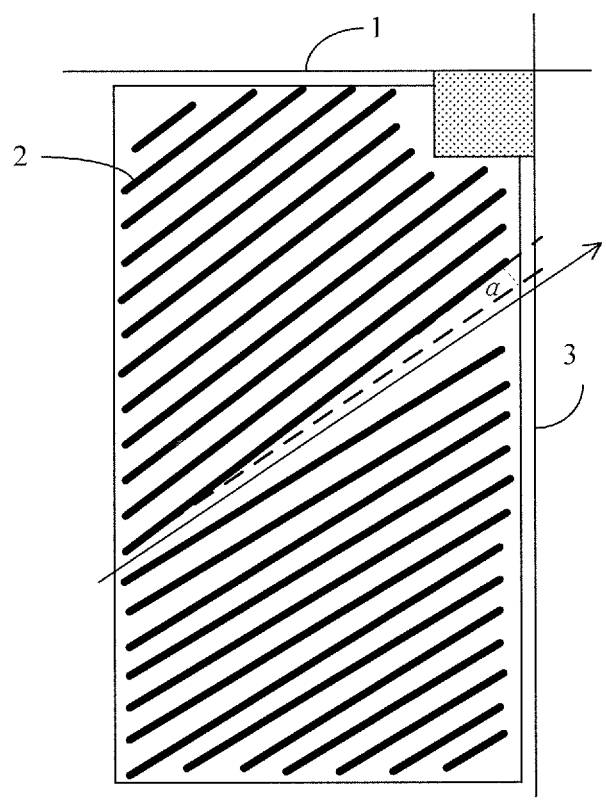
FIG. 4 is a schematic view showing the pixel structure of a display panel according to an embodiment of present invention.

Referring to FIG. 4, the display panel further comprises a plurality of pixel units on the first substrate, each of the pixel units comprises a pixel electrode, a common electrode, a first alignment layer, a gate line 1 and a data line 3. The gate line 1 and the data line 3 intersect with each other perpendicularly, for example. The first alignment layer is coated at the inner side of the first substrate with respect to the liquid crystal layer 15, and is formed with fine grooves along a certain direction through a rubbing process, for example. At least one of the pixel electrode and the common electrode is a comb-like electrode 2. The transmission axis of the first polarizer sheet is parallel with the line along which the alignment direction of the first alignment layer is located, and the transmission axis of the first polarizer sheet is perpendicular to the transmission axis of the second polarizer sheet.

The second substrate is further provided with a second alignment layer thereon, and the second alignment layer is for example coated on the inner side of the second substrate with respect to the liquid crystal layer 15, and is formed with fine grooves in a certain direction through a rubbing process, for example. In such a wide view angle display panel 10, the alignment direction of the second alignment layer on the second substrate is opposite to the alignment direction of the first alignment layer on the first substrate.

In this embodiment, the first substrate is an array substrate, and correspondingly the second substrate is an opposing substrate, for example, a color filter substrate.

In order to make the transmission axis of the second polarizer sheet 12 at the light exiting side of the wide view angle display panel 10 be parallel or substantially parallel with the transmission axis of the polarizer sheet at the light entering side of the TN 3D grating, in the present embodiment, the line along which the alignment direction of the first alignment layer of the wide view angle display panel 10 is located is at a predetermined angle, greater than 0° and less than 90°, with respect to the gate line 1 of the wide view angle display panel.

In comparison, the alignment direction of the first alignment layer in an existing wide view angle display panel is generally parallel with or perpendicular to the direction of the gate line 1. While in this embodiment, due to the angle relationship, in which the two polarizer sheets are perpendicular to each other, at the light entering side and the light exiting side, and due to the angle relationship, in which the directions of the first polarizer sheet 11 and the first alignment layer are parallel with each other, it is understood that the second polarizer sheet at the light exiting side of the wide view angle display panel is at an angle, greater than 0° and less than 90°, with respect to the gate line. For the purpose of ensuring the transmittance, the transmission axis of the first polarizer sheet 11 is parallel with the line along which the alignment direction of the first alignment layer is located. Because the angle difference of 45° usually exists between the transmission angles of the TN 3D grating and the wide view angle display panel, the transmission axis of the second polarizer sheet at the light exiting side of the wide view angle display panel is, after it assembled with a TN 3D grating, made to be at an angle less than 45° with respect to the transmission axis of the polarizer sheet at the light entering side of the TN 3D grating, that is, more close to a parallel relationship. Preferably, for example, the predetermined angle is 40° to 50°, for example, is 45° such that both of them are completely parallel with each other.

Figure 1:
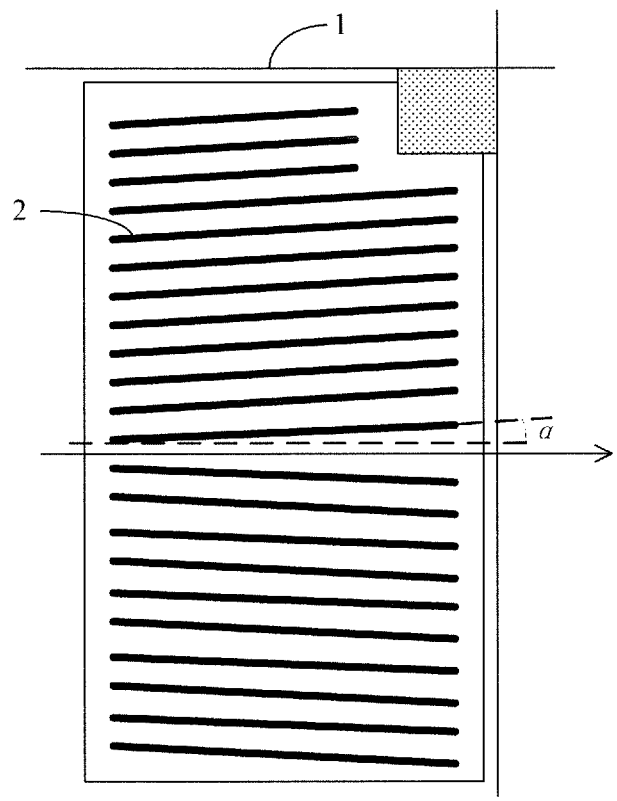
FIG. 1 is a schematic view of the pixel structure of a display panel in prior art.
Figure 2:
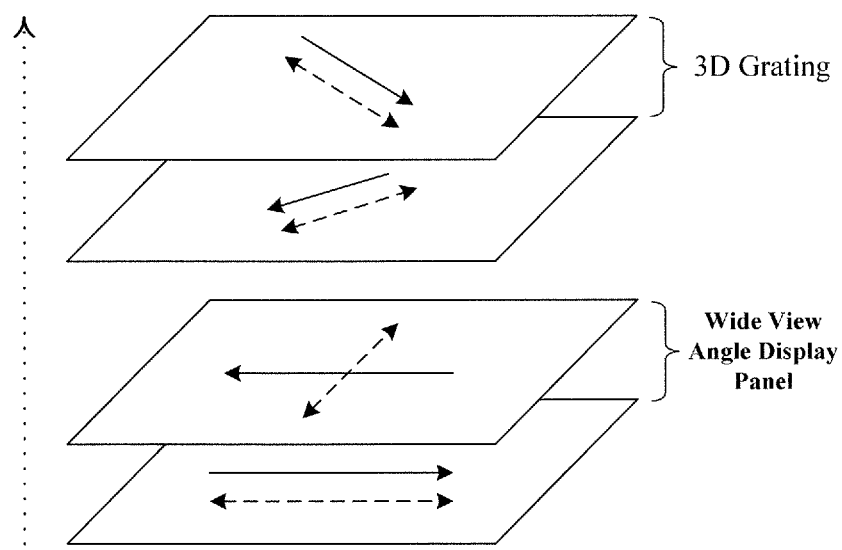
FIG. 2 is a schematic view showing the matching relationship between a display panel and a 3D grating in prior art.

As illustrated in FIGS. 2 and 3, compared with an existing wide view angle display panel, the direction of the transmission axis of a polarizer sheet (comprising both the polarizer sheets 11, 12 at the light entering side and the light exiting side) and the alignment direction of an alignment layer (comprising both the alignment layers on the first substrate and the second substrate), in the wide view angle display panel 10 of the present embodiment, are each rotated by a predetermined angle, such that the transmission axis of the second polarizer sheet 12 at the light exiting side of the wide view angle display panel 10 is substantially parallel with the transmission axis of the polarizer sheet 21 at the light entering side of the TN 3D grating, so as to match the optimal direction of the transmission axis at the light entering side of the TN 3D grating as well as possible. Where they are completely parallel with each other, good match with the optimal direction of the transmission axis at the light entering side of the TN 3D grating is obtained. Because in this embodiment the direction of the transmission axis of the polarizer sheet of the TN 3D grating is not altered, the viewing angle for the display device manufactured by combining the wide view angle display panel 10 and the TN 3D grating together does not departure from the optimal viewing direction for human eyes, thus the 3D display device can still attain a better angular characteristics for visual sense.

Because the directions of the polarizer sheet and the alignment direction of the alignment layer of the wide view angle display panel 10 are changed, if the comb-like electrode and the gate line in the wide view angle display panel still maintain their original inclination angles, then the direction of the fringe electric field and the original direction of the liquid crystal are different from each other to a great degree, the liquid crystal is disorientated, thereby the display effect may be disadvantageously affected. Therefore, the configuration of the comb-like electrode in the wide view angle display panel can be further modified correspondingly. Where the pixel electrode is an comb-like electrode and the common electrode is a plate electrode, the comb-like pixel electrode is closer to the liquid crystal layer with respect to the common electrode, and the comb-like pixel electrode is parallel with the line along which the alignment direction of the first alignment layer is located, or is at an angle of 7° to 11° with respect to the line long which the alignment direction of the first alignment layer is located. Where the common electrode is an comb-like electrode and the pixel electrode is a plate electrode, the comb-like common electrode is closer to the liquid crystal layer with respect to the pixel electrode, and the comb-like common electrode is parallel with the line along which the alignment direction of the first alignment layer is located, or is at an angle of 7° to 11° with respect to the line along which the alignment direction of the first alignment layer is located. When both the pixel electrode and the common electrode are comb-like electrodes, both of them are parallel with the line along which the alignment direction of the first alignment layer is located, or are at 7° to 11° with respect to the line along which the alignment direction of the first alignment layer. As illustrated in FIG. 4, the comb-like electrode 2 is parallel with the line along which the alignment direction (the direction of arrow in FIG. 4) of the first alignment layer is located (in a single domain mode) or assumes a angle of 7° to 11° with respect to the line, that is, the angle α in FIG. 4 is between 7° and 11° (in a single domain mode or in a double-domain mode, FIG. 4 is a schematic view regarding the double-domain mode). Namely, the comb-like electrode 2 is modified along with the modification of the alignment direction of the first alignment layer, such that the angle of the comb-like electrode 2 with respect to the gate line 1 is between 0° and 90°. Preferably, in a single domain mode, the angle is, for example between 40° and 50°, such as 45°; in a double-domain mode, the angle is, for example, between 29° and 61°, such as 33° and 52°. In FIG. 4, the plate electrode or the comb-like electrode that is below (a direction perpendicular to the paper surface) the comb-like electrode 2 is not illustrated.

An embodiment of present invention also provides a 3D display device comprising a TN 3D grating 20 and aforesaid wide view angle display panel 10. The TN 3D grating 20 is located at the light exiting side of the wide view angle display panel 10.

As illustrated in FIG. 3, the TN 3D grating 20 comprises a first substrate (not illustrated), a first polarizer sheet 21 located on the first substrate, a second substrate (not illustrated) and a second polarizer sheet 22 located on the second substrate, and a liquid crystal layer 25 arranged between the first substrate and the second substrate. The first substrate and the second substrate are arranged oppositely to each other, and form a liquid crystal cell with a sealant. The first polarizer sheet 21 is formed at the outer side of first substrate with respect to the liquid crystal layer 25, for example; and the second polarizer sheet 22 is formed at the outer side of the second substrate with respect to the liquid crystal layer 25, for example. The first substrate and the second substrate are provided with the first alignment layer and the alignment layer respectively, for example, and the two layers are coated on the inner sides of the first substrate and the second substrate respectively with respect to the liquid crystal layer 25, and further are formed with fine grooves along a certain direction in a rubbing process for example. The transmission axis of the first polarizer sheet 21 is parallel with the line along which the alignment direction of the first alignment layer is located, the transmission axis of the second polarizer sheet 22 is parallel with the line along which the alignment direction of the second alignment layer is located, and the transmission axis of the first polarizer sheet 21 is perpendicular to the transmission axis of the second polarizer sheet 22. For example, the second substrate is an array substrate, and the first substrate is an opposing substrate. For example, the first substrate is formed with evenly spaced strip electrodes thereon, and similarly the second substrate is also formed with evenly spaced strip electrodes, and the strip electrodes of the first substrate are directly opposed to the strip electrodes of the second substrate, thereby a voltage can be applied to these strip electrodes so as to regulate the orientation of the liquid crystal layer to generate gratings (barrier). The transmission axis of the second polarizer sheet 12 at the light exiting side of the display panel 10 is parallel with the transmission axis of the polarizer sheet 21 at the light entering side of the twisted nematic 3D grating, thereby the 3D grating 20 is made to match with the display panel 10.

Because the aforesaid wide view angle display panel 10, in which the optimal direction of the transmission axis at the light entering side of the TN 3D grating is matched, is employed, the direction for the transmission axis of the polarizer sheet of the TN 3D grating remains constant, the optimal characteristics of the viewing angle of the TN 3D display device can be ensured. Preferably, the transmission axis of the second polarizer sheet 12 at the light exiting side of the wide view angle display panel 10 is parallel with the transmission axis of the polarizer sheet 21 at the light entering side of the TN 3D grating 20, namely the optimal direction of the transmission axis at the light entering side of the TN 3D grating 20 is matched.

The above embodiments are only exemplary embodiments of the present invention, rather than limiting the protective scope of the present invention, the protective scope of the present invention is defined by the accompanying claims.

The invention claimed is:

1. A display panel, comprising a first substrate, a first polarizer sheet arranged on the first substrate, a second substrate, a second polarizer sheet arranged on the second substrate, a liquid crystal layer located between the first substrate and the second substrate, and a pixel electrode, a common electrode, a first alignment layer and a gate line formed on the first substrate,
    wherein at least one of the pixel electrode and the common electrode is a comb-like electrode, a transmission axis of the first polarizer sheet is parallel with a line along which an alignment direction of the first alignment layer is located, and the transmission axis of the first polarizer sheet is perpendicular to a transmission axis of the second polarizer sheet,
    the line along which the alignment direction of the first alignment layer is located is at a predetermined angle, greater than 0° and less than 90°, with respect to the gate line, and
    wherein, the comb-like electrode is parallel with the along which the alignment direction of the first alignment layer is located, or is at an angle of 7° to 11° with respect to the line along which the alignment direction of the first alignment layer is located.

2. The display panel according to claim 1, wherein the predetermined angle is between 40° to 50°.

3. The display panel according to claim 2, wherein the predetermined angle is 45°.

4. The display panel according to claim 1, wherein the pixel electrode is the comb-like electrode, the common electrode is a plate electrode, the comb-like pixel electrode is closer to the liquid crystal layer than the common electrode.

5. The display panel according to claim 1, wherein the common electrode is the comb-like electrode, the pixel electrode is a plate electrode, the comb-like common electrode is closer to the liquid crystal layer than the pixel electrode.

6. The display panel according to claim 1, wherein both the pixel electrode and the common electrode are comb-like electrodes.

7. The display panel according to claim 1, further comprising a second alignment layer formed on the second substrate, the alignment direction of the first alignment layer being opposite to an alignment direction of the second alignment layer.

8. A 3D display device comprising a twisted nematic 3D grating and the display panel according to claim 1, wherein the twisted nematic 3D grating is located at a light exiting side of the display panel.

9. The 3D display device according to claim 8, wherein a transmission axis of the second polarizer sheet at the light exiting side of the display panel is parallel with the transmission axis of the polarizer sheet at a light entering side of the twisted nematic 3D grating.

10. The display panel according to claim 2, wherein the pixel electrode is the comb-like electrode, the common, electrode is a plate electrode, the comb-like pixel electrode is closer to the liquid crystal layer than the common electrode.

11. The display panel according to claim 2, wherein the common electrode is the comb-like electrode, the pixel electrode is a plate electrode, the comb-like common electrode is closer to the liquid crystal layer than the pixel electrode.

12. The display panel according to claim 2, wherein both the pixel electrode and the common electrode are comb-like electrodes.

13. The display panel according to claim 4, further comprising a second alignment layer formed on the second substrate, the alignment direction of the first alignment layer being opposite to an alignment direction of the second alignment layer.

14. The display panel according to claim 5, further comprising a second alignment layer formed on the second substrate, the alignment direction of the first alignment layer being opposite to an alignment direction of the second alignment layer.

15. The display panel according to claim 6, further comprising a second alignment layer formed on the second substrate, the alignment direction of the first alignment layer being opposite to an alignment direction of the second alignment layer.

* * * * *